Figure 1B:
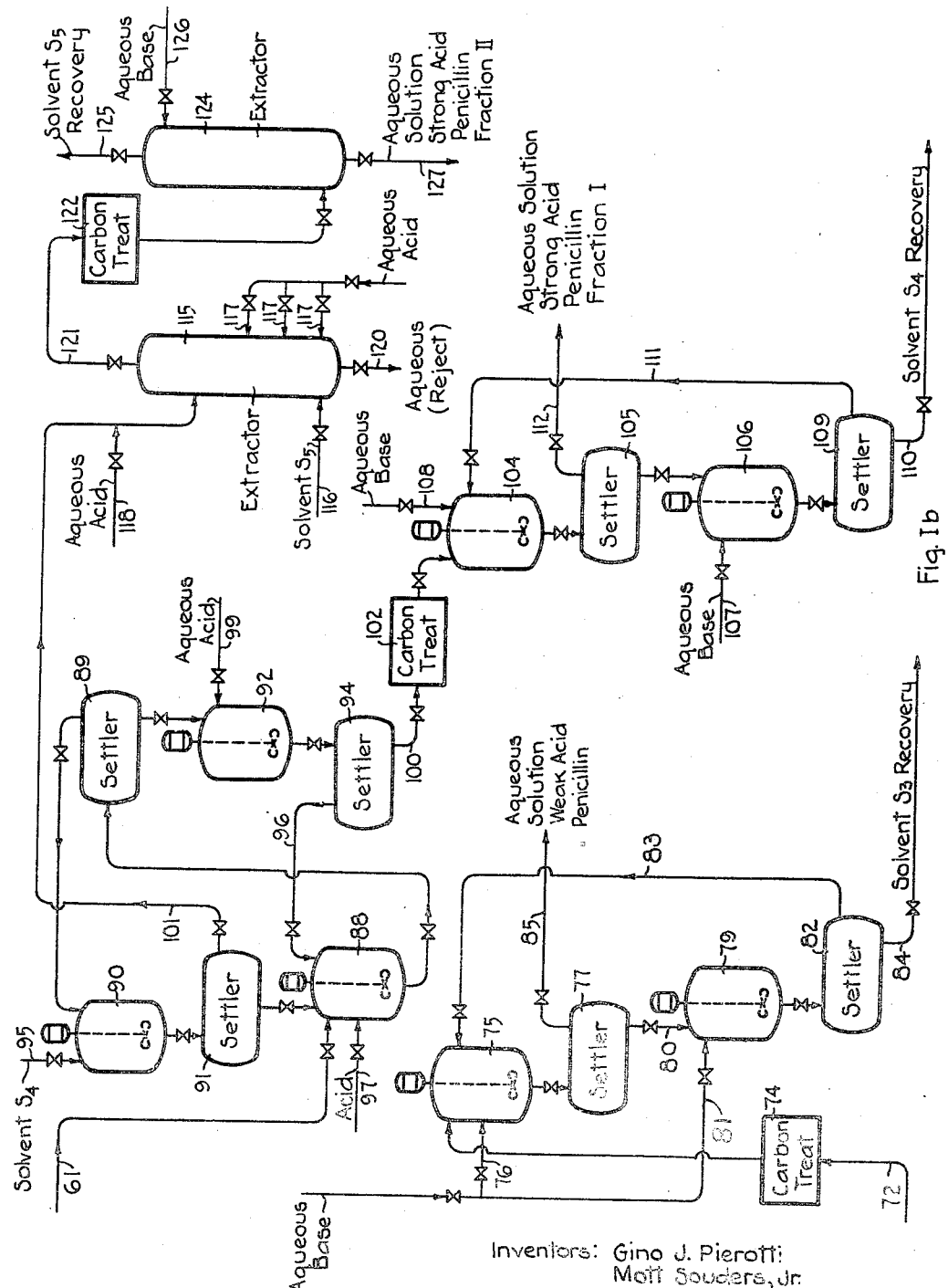

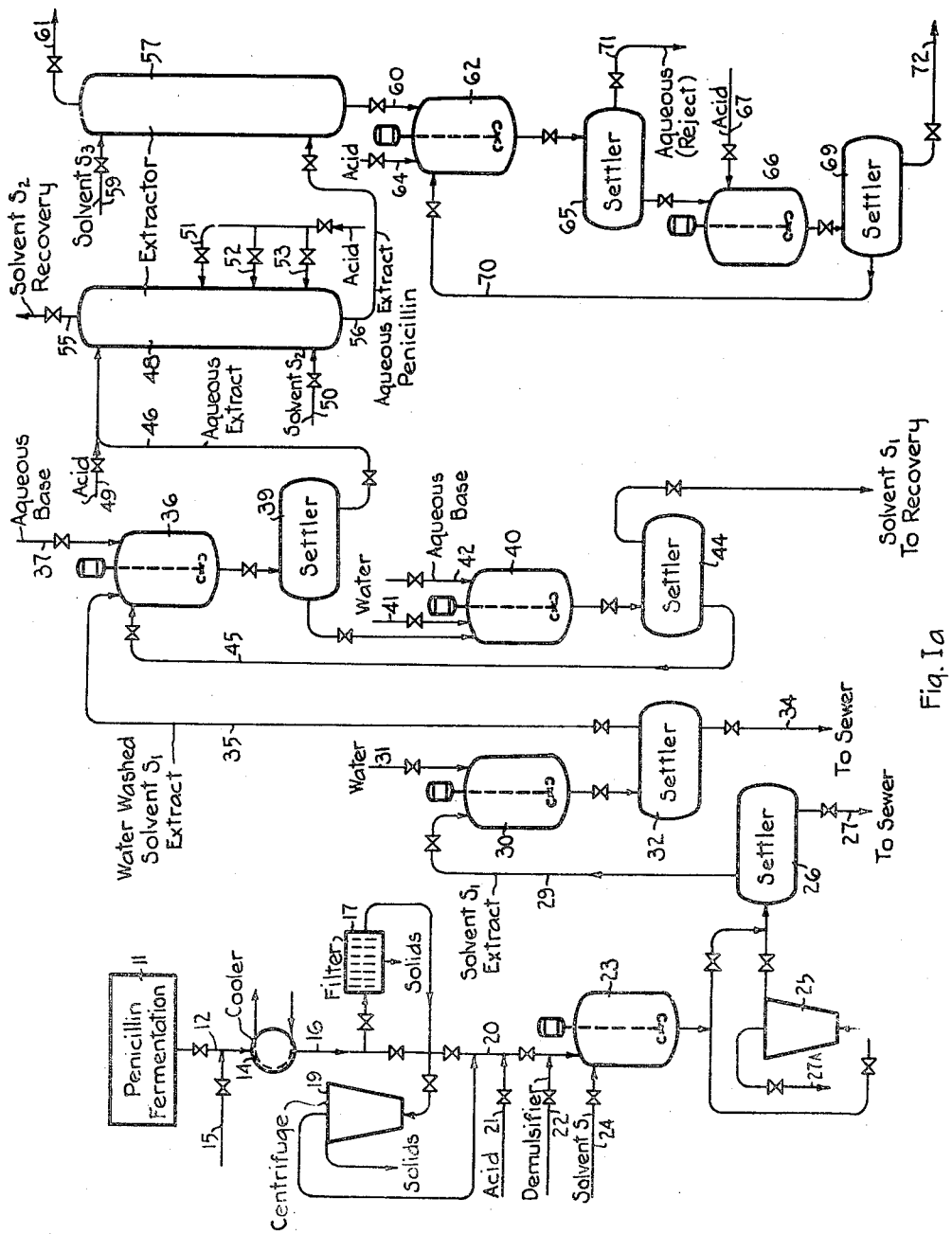
Fig. Ia
Inventors: Gino J. Pierotti
Matt Souders, Jr.
Elmer A. Anderson
By their Attorney:

Inventors: Gino J. Pierotti
Mott Souders, Jr.
Elmer A. Anderson
By their Attorney:

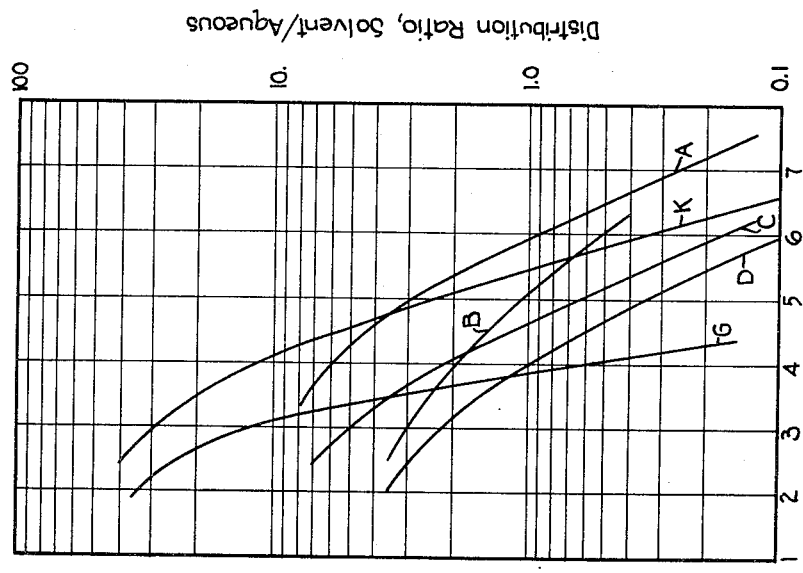
Fig. III
Distribution of Penicillins G and K and of Impurities A, B, C, and D between chloroform and aqueous solution.
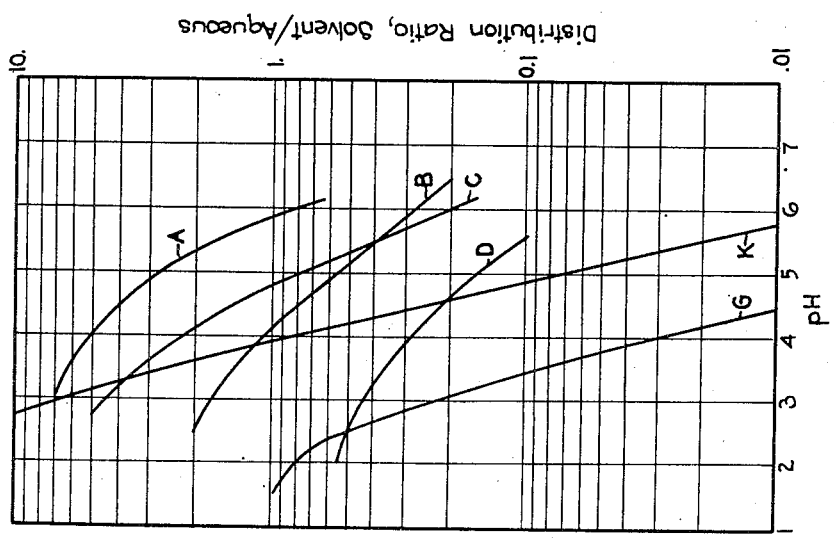
Fig. II
Distribution of Penicillins G and K and of impurities A, B, C, and D between di-normal-butyl-ether and aqueous solution.
Inventors: Gino J. Pierotti
Mott Souders, Jr.
Elmer A. Anderson
By their Attorney: *James Todorovic*

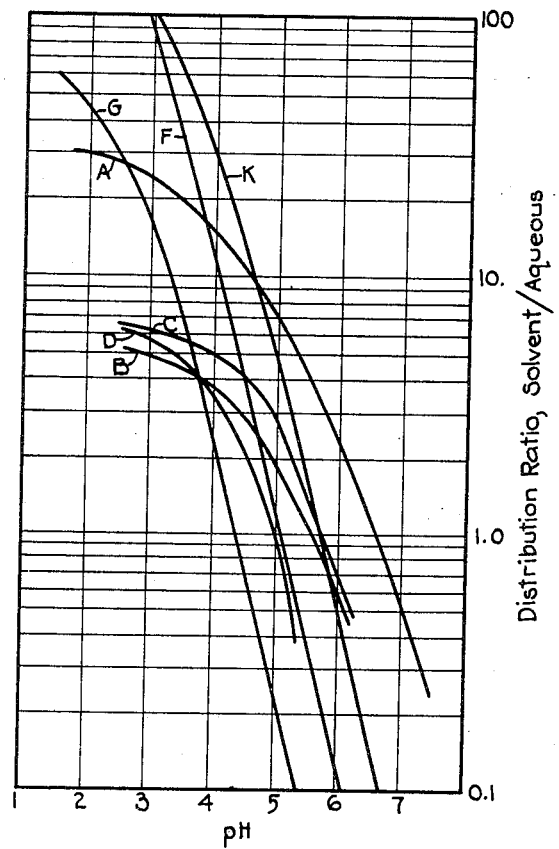
Fig. IV
Distribution of Penicillins F, G, and K and of Impurities A, B, C, and D between Methyl-isobutyl-ketone and aqueous solution Patented Apr. 4, 1950

2,503,215

UNITED STATES PATENT OFFICE 2,503,215

PURIFICATION OF PENICILLIN

Gino J. Pierotti, Albany, Elmer A. Anderson, Berkeley, and Mott Souders, Jr., Piedmont, Calif., assignors to Shell Development Company, San Francisco, Calif., a corporation of Delaware Application June 11, 1946, Serial No. 676,072

5 Claims. (Cl. 260—302)

This invention relates to a process for the purification and concentration of penicillin. More particularly, it relates to an improved process for the separation of constituents of a fermentation broth, produced in the preparation of penicillin, to effect separation of penicillin from associated impurities and further to effect separation of different forms or species of penicillin.

Penicillin, in the broad and generic sense, is an organic acid which possesses remarkable bacteriostatic activity. In this generic sense, it is produced during the growth of certain molds such as penicillium notatum. By virtue of its antibiotic activity, it is an important pharmaceutical material for combating many diseases and preventing the spread of infections.

In the earlier work on penicillin, the general conditions for its production by mold growth were determined, its general solubility characteristics and stability were established, and a general process for its recovery from the fermentation broth and its concentration was developed. This process comprised essentially (1) extraction of the fermentation broth at a pH of about 2 with amyl acetate (which resulted in a certain amount of purification), (2) extraction of the amyl acetate extract of penicillin at a pH of 7-8 with an alkaline solution thus effecting further purification as well as considerable concentration, the penicillin being transferred to the aqueous phase as the soluble salt, (3) extraction of the aqueous extract again at a pH of about 2 with chloroform to effect still further purification, and (4) extraction of the chloroform extract with an alkaline solution to once again put the penicillin in an aqueous solution as the desired salt, followed by a drying process designed to effect water removal under conditions which would not seriously affect the activity of the penicillin.

Demands for penicillin in increasing quantities and of proprietary preparations of it for use having higher and higher activity, without regard to cost, during the recent war period, resulted in rapid developments in the preparation of penicillin, including the development of new strains of molds and improved culture media for the fermentation. As a result of the great activity in the field of producing penicillin (in the fermentation broth): larger overall concentrations of penicillin in the broth are now obtained, requiring modifications in recovery procedure to effect the same percentage recovery of available penicillin; recognition of different forms of penicillin has resulted, the relative proportions of the different forms having been materially affected, thus requiring modifications in recovery procedure to effect the most satisfactory recovery, including the separation of more active from less active forms of penicillin; and production and recognition of impurities with many physical and chemical characteristics very similar to those of penicillin, necessitating modified procedures for their effective separation from penicillin.

As indicated hereinabove, intensive work on penicillin (the penicillins) has led workers in the field to belive that there are at least four different antibiotic substances which come under the broad term penicillin and that each of the four substances may be represented by the empirical formula $C_9H_{11}O_4SN_2.R$. The differences in the four penicillins are attributed to the R radical which is different for the different species. In accordance with an article on Penicillin in Science, December 21, 1945, R is as follows in the different penicillins: in Penicillin F, R is $\Delta^2$-pentenyl ($-CH_2.CH=CH.CH_2.CH_3$); in Penicillin G, R is benzyl ($-CH_2.C_6H_5$); in Penicillin X, R is parahydroxybenzyl ($-CH_2.C_6H_4OH-p$); and in Penicillin K, R is n-heptyl ($-CH_2(CH_2)_5.CH_3$)

Two suggested structural formulas of penicillin are as follows:

1. B-lactam structure (as sodium salt)

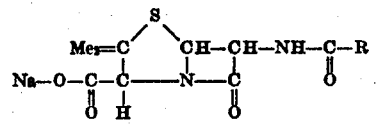

2. Incipient azlactone structure (as sodium salt)

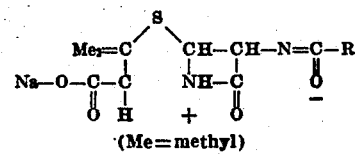

(Me=methyl)

Whereas, it is readily appreciated that the physiological characteristics of benzyl ($C_7$) and n-heptyl ($C_7$) substituted compounds such as penicillins G and K may be quite different, their physical properties such as relative solubilities, etc., would be expected to be similar enough to make their separation one from the other a matter requiring considerable ingenuity surpassing ordinary skill in the art.

Furthermore, to complicate matters even more, it has been discovered that the normal broth resulting from the preparation of penicillin by fermentation contains considerable proportions of impurities, which are extracted by solvents such as amyl acetate under the conditions of extraction of penicillin. These impurities may be classified in four groups or classes depending upon their extraction from aqueous solution by different solvents and upon their pK values. Furthermore, the acid dissociation constants and solvent/water distribution ratios are so closely related to those of the various penicillins as to make their effective separation from the penicillins a very difficult matter.

It is an object of this invention to increase the recovery of penicillin from its fermentation broth, to improve the separation of penicillin in fermentation broth from non-antibiotic substances associated therewith, and to improve the separation of different forms of penicillin whereby a penicillin preparation of greater antibiotic activity for a particular purpose is obtained. Other specific objects will be apparent from the description of the process of this invention as given hereinafter and in the claims.

Now, in accordance with the process of the present invention, penicillin is recovered in high yield from a fermentation broth and the most active form of penicillin is effectively separated from other less active forms of penicillin as well as from non-antibiotic impurities associated therewith in the fermentation broth.

Broadly described, the process of this invention comprises a combination of a series of selected and correlated extractions of aqueous extracts of penicillin with selected organic solvents and of organic solvent extracts of penicillin with aqueous solutions, all under controlled conditions as to acidity, ratios of volume of penicillin-containing solution to extractant, etc.

The overall process of an illustrative embodiment of the application of this invention comprises the following steps:

(1) A solvent extraction with a polar solvent $S_1$, such as amyl acetate, of a penicillin-containing fermentation broth at a low pH whereby penicillin, together with solubility-related impurities, is extracted from the broth and thereby partially purified;

(2) The solvent $S_1$ extracted penicillin is transferred as a soluble salt to an alkaline aqueous solution as a first aqueous extract;

(3) The first aqueous extract is solvent-washed at a pH of from about 3 to about 6 with a selective solvent $S_2$ to remove certain types of impurities;

(4) The solvent $S_2$-washed aqueous extract is solvent extracted at a pH of about 3.5 to about 6 with a selective solvent $S_3$ which selectively dissolves the weakest form of penicillin (K) to give a solvent $S_3$ fraction of penicillin K together with corresponding weak acid impurities and an aqueous fraction of stronger penicillins together with organic impurities having somewhat similar acid characteristics;

(5) The solvent $S_3$ fraction of penicillin K is then washed with water at a pH of about 2.0-3.5, whereby a large proportion of the impurities is removed in the aqueous wash, and the purified penicillin K is then recovered from the $S_3$ solvent by aqueous extraction at a pH of about 7-8;

(6) The aqueous fraction of stronger penicillins (G and X) is solvent extracted at a pH of about 2-3.5 with a solvent $S_4$ which selectively dissolves G but which does not dissolve X;

(7) The penicillin G is subsequently extracted with aqueous base from the solvent $S_4$ extract and simultaneously further separated from impurities;

(8) The aqueous reject from the solvent $S_4$ extraction may then be extracted with a suitable solvent $S_5$, such as amyl acetate, and recovered therefrom in an alkaline aqueous solution as penicillin X.

It will be understood from further description of the invention that the order of some of the foregoing steps, such as steps (3) and (4), may be reversed, within the broad scope of the invention. Furthermore, some of the steps may be replaced with their equivalents which will be understood from the curves in Figures II, III and IV. Thus, step (4) may be replaced with a step (4') in which there is utilized a solvent such as dinormalbutyl ether at a pH of from about 2 to about 4 to effect a separation between penicillins G and K. Still further, the solvent washing of step (3) may be applied to aqueous solutions of the separated penicillins G and K.

This process may be utilized to effectively separate penicillins G, X and K one from the other and from the impurities associated therewith in the fermentation broth. If penicillin F is present it will be distributed between the G and K products.

The process of this invention will be more clearly understood from a description of a preferred embodiment thereof with particular reference to the drawings wherein Figures I$a$ and I$b$ represent a schematic flow diagram of the preferred embodiment of the process, and Figures II and III are graphs showing the relationships between the distribution of certain of the penicillins and of four classes of impurities between certain solvents and aqueous solution at various pH values.

Referring to Figures II, III and IV where curves G, K and F refer to penicillins G, K and F, respectively, and curves A, B, C and D refer to four different impurities which are associated with penicillin in the first aqueous extract after the first solvent extraction of the penicillin broth, it will be seen that the distribution relationships present a difficult problem of separation and purification. However, it was the discovery of these solubility relationships which suggested in part the solution to the problem. The embodiment of this invention represented in Figures I$a$ and I$b$ is a preferred manner of effecting the desired separations by a coordinated series of operations in conformance with the distribution relationships indicated by the curves in Figures II and III.

It will be seen from Figure II that by properly contacting a mixture comprising penicillins G and K and impurities designated A, B, C and D with dinormalbutyl ether and water at selected pH values such as a pH of about 3-6, preferably about 5, impurities A, B and C may be separated effectively from penicillins G and K. It has also been found that other substantially non-polar substances, such as toluene, may be utilized to effect a similar separation. Other ethers, e. g., di-n-propyl ether, di-isopropyl ether, di-allyl ether, propyl butyl ether, methyl-isobutyl ether, etc., may be used also.

Referring to Figure III, it is seen that chloroform and an aqueous solution may be utilized at a pH of from about 3.5 to about 6 and preferably about 5 to effect a substantial separation of penicillin K from penicillin G with impurities A and B going with penicillin K, and impurities C and D being more or less equally distributed between penicillin K and penicillin G. Of course, by utilizing a dinormalbutyl ether prior-treatment at a pH of about 5.5, impurities A, and B and C will have been largely removed, so that a subsequent chloroform extraction of an aqueous solution at a pH of about 5 effectively separates the penicillins K and G, with the impurity D being about equally divided between the two. It has been found that other partially halogenated hydrocarbons, particularly partially halogenated aliphatic hydrocarbons, such as ethylene dichloride, exhibit similar selectivity characteristics although the distribution ratios between solvent and aqueous phases for the different penicillins and/or impurities may be different, i. e., more favorable or less favorable with regard to amount of solvent to use in extracting from aqueous, or amount of aqueous to use in extracting from solvent.

Referring again to Figure II, it is seen that as an alternative to the foregoing-described chloroform treatment, an organic solvent with the selectivity characteristics of dinormalbutyl ether at a pH of from about 2 to about 4 may be utilized to effect the separation of penicillins G and K.

Referring to Figure IV, it is seen that the distribution of impurities A, B, C and D and of Penicillins F, G and K between a highly polar organic solvent such as methyl-isobutyl-ketone and aqueous solution poses an overall problem in separation which is not readily apparent. However, referring to the curves in Figure IV, it is seen that impurities B, C and D may be effectively separated from penicillin K by extracting a methyl-isobutyl-ketone solution of those substances with aqueous solution having a pH of from about 2 to about 3.5, and particularly at a pH of about 3. It is also to be seen that methyl-isobutyl-ketone may be utilized to effectively separate impurities A, B and C from penicillin G in an aqueous solution of all of them at a pH above about 5. The curves will suggest other separations which can be effected, such as A from G at any pH above about 4, etc.

Although selectivity is an essential characteristic required of a suitable solvent-aqueous combination to accomplish the necessary purification of penicillin from impurities and separation of the penicillins from each other in accordance with the invention, there are other important factors to be considered. Appropriate distribution ratios are necessary in order to effect the required separation of the penicillin from a large part of the water (concentration). Such concentration is essential in any feasible process since a broth containing penicillin in concentrations ranging from about 100 up to about 350 oxford units per cc. of broth, must be concentrated at least about 100-fold, assuming complete recovery, in order to yield a final aqueous solution which can be satisfactorily used or dried by suitable vacuum and/or lyophilic drying.

Referring again to Figure III, it is seen that a chloroform solution of penicillin K and impurity D may be effectively treated with aqueous solution at a pH below about 4 and preferably from about 2 to about 3.5 to wash out the impurity D; this would also apply for any impurities A, B and C present, but to a smaller extent. Also a chloroform solution of penicillin G and impurity D may be thus separated at a pH of about 2–3. The selectivity between penicillin G and impurity D is about the same with an ethylene-chloride-aqueous combination at a pH of about 2–3, but the solubility of the penicillin in the organic solvent is appreciably less.

An application of the present invention will now be described with reference to the embodiment represented by Figures Ia and Ib of the drawings. The description of this illustrative application of the process may be divided into the following parts: (I) Preliminary treatment, (II) Main solvent extraction, (III) First aqueous extraction, (IV) Solvent removal of impurities, (V) Separation of weaker from stronger penicillins, (VI) Purification of weaker penicillins (K), (VII) Recovery and concentration of weaker penicillins (K), (VIII) Purification and separation of stronger penicillins (G and X), (IX) Recovery and concentration of stronger penicillin (G), and (X) Recovery and concentration of stronger penicillin (X).

Inasmuch as this process involves several extractions, the nomenclature for identifying various extracts is complicated. To clarify matters an extract produced with solvent S for example will be called "solvent-S-extract"; or one produced by water treatment of a solvent solution will be called "aqueous extract"; etc. Solvents utilized at different steps of the process will be differentiated by the use of appropriate subscripts; for example, solvent $S_1$ will designate the solvent used first in the process, solvent $S_3$ will designate the solvent introduced into the third step of the process wherein a solvent is involved. Solvent $S_1$ and $S_3$ may be the same organic compound or they may be different substances, depending upon the requirements of the respective steps of the process. Furthermore, in order to simplify the description of the process, the various penicillins F, G, K and X and the various impurities A, B, C and D as already characterized hereinabove, sometimes will be referred to by the use of the letters alone.

I. *Preliminary treatment*

Penicillin may be produced from different types and/or strains of mold growth grown in and/or on appropriate culture media. From the culture of the mold there is obtained an aqueous solution containing varying amounts of solids and various different organic substances, and from about 50 to about 350 Oxford units per cc. of solution or broth (see article by Florey and Jennings in British Journal of Experimental Pathology, vol. 23, page 120, June, 1942). Penicillin acid decomposes very easily at temperatures slightly above 0° C. Strong acids, strong bases, heavy metals, and certain other reagents destroy it. Accordingly, this entire extraction process is carried out as closely to 0° C. as possible without freezing the water present. All acids or bases introduced to control the pH values throughout the system are added in dilute aqueous solutions, and extractions in even dilute acids and bases are carried out as rapidly as possible.

Referring to Figures Ia and Ib, 11 represents a fermentation plant wherein the penicillin is produced and removed therefrom as an aqueous broth through line 12 to cooler 14. Aqueous solutions of penicillin from other sources may join line 12 through valved line 15. In the cooler 14 the broth is chilled to just above its freezing point, about 0° C. It is then removed through a line 16 and may be treated to remove solids by passing it through the filter 17 or centrifuge 19 or both and withdrawn through line 20.

The broth is acidified to a pH of from about 2.0 to about 3.5 in order to ensure the presence of the penicillin in the solution in the form of the free (unionized) acid, which is soluble in the solvent employed in the following extraction step. The acidifying acid should be an inorganic acid which is not soluble in the solvent $S_1$, such as sulfuric or phosphoric acid, and should be employed in proportions corresponding to between abut 5% and 10% by volume of the clarified broth, the solution of the acid having a strength of from about 2% to about 30%. This acid may be added through a valved line 21 and, if desired, mixed with the broth by any suitable means prior to its contact with the solvent. If desired, a demulsifying agent may be added through a valved line 22 to aid in the subsequent separation of aqueous and solvent phases in the main extraction step.

II. *Main extraction*

The broth in line 20 is extracted with solvent $S_1$ (preferably amyl acetate) by passing it through a series of mixers and centrifuges and/or settlers, including washing the solvent-$S_1$-extract with water in a combination of mixer and settler. The acidified broth having a pH between about 2 and 3.5 is admixed in mixer 23 with solvent $S_1$ introduced into the mixer through valved line 24. The resulting mixture is then separated into two phases in centrifuge 25 and/or settler 26, depending upon the ease of separation. It may be desirable that several extraction stages be provided by a series of mixers and settlers. Separate aqueous phase is discarded through valved lines 27 and 27A. Solvent-$S_1$-extract phase is passed through a line 29 into a mixer 30 wherein it is washed with water (introduced through a valved line 31). The resulting mixture is then separated into two phases in settler 32. Separated aqueous phase is discarded through a valved line 34. Washed solvent-$S_1$-extract phase is delivered by means of a line 35 to the next step of the process. The aqueous phase during the water washing in mixer 30 should have a pH maintained between about 2.0 and 3.5, and preferably between about 2.5 and about 3.0, by any suitable means such as by adding an appropriate amount of acid with the water through line 31. If distilled or demineralized water is employed, the pH will normally adjust itself at about the proper value. However, if water containing base minerals is employed, it will generally be advisable to add a small amount of acid with the water.

Solvent-to-feed ratios used in this first extraction are usually between about 2:1 and 1:5, although higher or lower ratios may be employed.

III. *First aqueous extraction*

Water washed solvent-$S_1$-extract, comprising penicillin and other acids (impurities) dissolved in solvent-$S_1$, derived from line 35, or from some other source not shown, is extracted and concentrated with dilute aqueous base in a series of mixers and settlers 36, 39, 40 and 44. The extracting aqueous base preferably has buffering capacity and is an inorganic compound. However, with the sequence of operations employed in this first aqueous extraction ordinary strong inorganic bases may be used without unduly inactivating the penicillin.

The purpose of this extraction step is to concentrate the penicillin in an aqueous phase and to separate acid impurities which are substantially weaker than penicillin. The aqueous base solution causes a larger portion of the penicillin and stronger acids to become ionized than of those acids substantially weaker than penicillin. Since the ions and ionic salts of these organic acids are more soluble in water than in the solvent, in comparison with the undissociated acids, the former are extracted into the aqueous phase. As a result, a further preliminary purification and concentration are effected.

Some suitable aqueous bases comprise Ca, Sr, Ba hydroxides, Na and K hydroxides, bicarbonates, phosphates, citrates, tartrates, etc. The aqueous base usually contains between about 0.2% and about 2% by weight of the alkaline compound; and the amount of aqueous base solution added is usually between about ⅕ and 1/50 the volume of the solvent-$S_1$-extract. This amount of the aqueous base should be such as to result in an aqueous extract having a pH from about 6 to about 8.

After admixing the water-washed solvent-$S_1$-extract in mixer 36 with aqueous base introduced through valved line 37, the resulting mixture is separated into two phases in settler 39. The separated solvent-$S_1$ phase is withdrawn to a mixer 40 for a second stage of the aqueous extraction. Aqueous base, and if desirable additional water are introduced through lines 42 and 41, respectively into mixer 40 and admixed with the previously once-extracted solvent-$S_1$-extract. The resulting mixture is separated into two phases in settler 44. The separated solvent-$S_1$ phase is withdrawn and returned to a suitable solvent recovery system and subsequently for reuse in the main extraction step. The separated aqueous-extract phase is passed through valved line 45 to the first stage mixer 36. By this means undesirable substances extracted by the aqueous base in the second stage of the extraction may be at least partially rejected to the solvent-$S_1$ and at the same time the excess alkalinity in the second stage aqueous extract may be utilized to supply a considerable proportion of the alkalinity required in the first stage. Furthermore, by this means an overall pH gradient in the general direction of flow of the aqueous solution may be maintained which is different from the pH gradient in the usual countercurrent contacting or extracting process. The artificially established pH gradient may be selected so as to effect a much better recovery of the penicillin, minimize inactivation while employing even the stronger alkali hydroxides as the extracting base, and minimize the aqueous extraction of undesirable substances in the aqueous base along with the penicillin. A satisfactory combination of pH ranges to be maintained in mixers 36 and 40 is a range of about 6.5–7.5 in the first stage mixer 36, and a range of about 7.0–8.0 in second stage mixer 40. About 70–80% of the total alkalinity (base) will normally be introduced into stage 1, and the remainder introduced into stage 2.

IV. *Solvent removal of impurities*

As pointed out earlier, it has been discovered that the non-antibiotic substances which constitute the principal impurities in the first aqueous extract and which amount to about 50% of the total solid content in this extract may be classified into four classes of substances. They have been designated therein as A, B, C and D. With reference to the curves in Figure II of the drawings, it has been pointed out hereinabove that it is possible to remove the impurities A, B and C from an aqueous solution such as this first aqueous extract by extracting with a solvent such as dinormalbutyl ether at a pH of about 3–6 and preferably 5, while leaving the penicillin in the aqueous solution. This is accomplished in this application of the invention by contacting the first aqueous extract with a solvent $S_2$, such as dinormalbutyl ether, in a counter-current extractor while maintaining an adjusted pH value in the contacting zone by suitable introduction of dilute acid preferably at a multiplicity of points.

This purification step is carried out by passing the separated aqueous extract phase from the first stage settler 39 through a valved line 46 into extractor 48. The aqueous extract is acidified by the addition of dilute acid through valved line 49. Solvent $S_2$, which will preferably be dinormalbutyl ether, is fed into the extractor 48 by means of a valved line 50. If desirable to maintain a more favorable pH gradient throughout a portion of the extraction zone, a portion of the required acid may be introduced into the extractor at a multiplicity of points such as by valved lines 51, 52 and 53. Solvent-$S_2$-extract, which contains a predominant proportion of the impurities A, B, and C is withdrawn through valved line 55 and is delivered to a suitable solvent recovery operation, from which the recovered solvent may be returned to the process. The solvent-$S_2$-washed aqueous extract now contains the penicillin and is relatively free of impurities A, B and C, but is still contaminated with impurity D.

From an earlier discussion of Figure IV, it will be understood that methyl-isobutyl-ketone may be utilized under selected conditions of pH to effect a selective separation of certain of the impurities from certain of the forms of penicillin. For example, by extracting an aqueous solution of penicillin G (possibly also F and K) and impurities A, B, C and D at a pH above about 5, and preferably from about 5 to about 6, with methyl-isobutyl-ketone, impurities A, B and C may be effectively separated from penicillin G. Penicillin K would be removed also in the solvent; but, under some circumstances, as already referred to, this may be highly desirable, since, for some purposes penicillin K may be considered as nothing more than a diluent of penicillin G. If it is desired to recover the penicillin K from admixture with the separated impurities, reference to Figure IV shows that this may be accomplished by treating the ketone-extract with aqueous solution at a pH of from about 2 to about 3.5, preferably about 3, thereby transferring the impurities, at least the major proportion of B, C and D, and a substantial proportion of A, to the aqueous solution.

V. *Separation of weaker penicillins from stronger penicillins*

The curves in Figure III of the drawings show that the solvent-$S_2$-washed first aqueous extract may be separated into two fractions by contacting with a solvent such as chloroform at a pH of about 5.5, with penicillin K and about one-third of the impurity D being extracted into the chloroform while the penicillin G and about two-thirds of the impurity D remain in the aqueous phase. Thus the weaker penicillin K is separated from the stronger penicillin G. Since penicillin F is about intermediate between K and G in acid strength and distribution between chloroform and water, it will be about equally divided between the two phases. Penicillin X, which is stronger than K and F and is relatively insoluble in chloroform will remain in the aqueous phase. In general, penicillin F and X are present in relatively minor proportions.

The solvent-$S_2$-washed-first-aqueous-extract is passed through a valved line 56 to an extractor 57, which may be a countercurrent contacting apparatus or a multiple-stage combination of mixers and settlers. The aqueous extract is contacted with a solvent $S_3$ in extractor 57. The solvent-$S_3$ is introduced by a suitable line 59. In the use of chloroform or any equivalent solvent having a density greater than that of water, the solvent-$S_3$ is fed into the extractor at a point above the entry point of the aqueous extract. Of course, if the density relationships are reversed the relative points of entry will be reversed. The solvent-$S_3$-extract is withdrawn through valved line 60 and delivered thereby to the sequence of operations comprising the next steps which relate to the purification of the weaker penicillin (K) and the subsequent recovery and concentration of the weaker penicillin (K). The aqueous raffinate from the solvent-$S_3$-extraction is withdrawn from extractor 57 by means of a valved line 61 and delivered thereby to step (VIII) of the process.

VI. *Purification of weaker penicillins*

The curves in Figure III show that impurity D may be effectively separated from penicillin K by contacting the mixture of the two with a solvent such as chloroform and with aqueous solution at a pH of from about 2 to about 3.5. Accordingly, in the present application of this discovery, the solvent-$S_3$-extract is washed with an aqueous solution at a pH of from about 2 to about 3.5.

The solvent-$S_3$-extract is admixed in a mixer 62 with dilute aqueous acid or pure water introduced through line 64, whereby a pH of about 2.5 is maintained. The resulting mixture is separated into two phases in settler 65. The separated solvent-$S_3$ phase is admixed with a further quantity of dilute acid at a pH of about 2.5 in mixer 66. The resulting mixture is separated into two phases in a settler 69. The separated aqueous phase is passed through a line 70 to the first stage mixer 62 where it supplies part of the required acidity. The net aqueous phase produced in the two phases is withdrawn by means of valved line 71 from the first stage settler 65. This aqueous phase constitutes the reject of impurities, which is substantially the remainder of impurity D, together with minor proportions of other impurities and even a portion of any penicillin F which might have reached this stage in the process.

VII. *Recovery and concentration of weaker penicillins*

The solvent-$S_3$ phase separated in settler 69 is passed by means of valved line 72 to a carbon treat purifier 74 wherein certain color bodies are removed by adsorption. The carbon-treated $S_3$-extract is then treated with an alkaline solution to further concentrate and to recover the penicillin K. This is accomplished by admixing the solvent-$S_3$-extract in a mixer 75 with an aqueous base introduced by a line 76 at a pH of from about 6.8 to about 7.5, preferably about 6.8–7. The resulting mixture is separated into two phases in settler 77. The solvent-$S_3$ phase is introduced into mixer 79 by means of a valved line 80 and mixed with a further quantity of aqueous base introduced via valved line 81. The pH is maintained at about 7.5 to about 8 in this second stage of the operation. The resulting mixture is separated into two phases in settler 82. The aqueous extract phase is returned to the first stage mixer 75, by means of valved line 83. The solvent-S₃ phase separated in settler 82 is withdrawn through a valved line 84 and delivered thereby to a suitable solvent recovery system. The aqueous phase separated in settler 77 is withdrawn through a valved line 85 as a substantially neutral solution of the weak acid penicillin K suitably purified and concentrated to be further concentrated by a flash drying technique and/or lyophilic drying. In such a flash drying method between about 75% and 95% of the water is evaporated from the penicillin as quickly as possible under reduced pressure and at a temperature of not above about 10° C. The resulting aqueous solution is then ready for use, packaging, drying or other treatment as may be desired.

VIII. Purification and separation of stronger penicillins

The solvent - S₃ - extracted - first - aqueous-extract (the raffinate) containing the stronger penicillins, impurity D and minor proportions of other impurities, is treated with a suitable solvent-S₄ under conditions to extract the penicillin G with the solvent and thereby separate it from the impurity D, the other impurities which may be present at this stage in minor proportions, and largely from any penicillin X which may be present. In order to accomplish this, the raffinate is passed through line 61 to a second-stage mixer 88 of a three-stage combination of mixers and settlers, comprising first-stage mixer 90 and settler 91, second stage mixer 88 and settler 89, and third-stage mixer 92 and settler 94. A solvent-S₄ having the characteristics depicted for chloroform in Figure III at a pH below about 3.5, i. e. an increasing selectivity between penicillin G and impurity D as the pH is decreased below about 3.5, is delivered to the first-stage mixer 90, of this mixer-settler combination, by means of a valved line 95. This fresh solvent-S₄ is admixed in mixer 90 with separated aqueous phase from settler 89 whereby a more selective separation is effected at this end of this three-stage operation. The resulting mixture is separated into two phases in settler 91. The separated solvent-S₄-extract phase is admixed in mixer 88 with the fresh raffinate (aqueous phase) from extractor 57 delivered thereto through line 61, and also with separated aqueous phase withdrawn from third-stage settler 94 by means of a line 96. Dilute aqueous acid may be added to mixer 88 by means of a valved line 97, if desirable to maintain the required pH value. A pH range of between about 2 to 3 is maintained in mixer 88. The resulting mixture in mixer 88 is separated into two phases in settler 89. The separated solvent-S₄-extract phase is admixed in third-stage mixer 92 with aqueous acid or pure water delivered thereto by means of a valved line 99. A pH of about 2.5 is preferably maintained in mixer 92. The resulting mixture is separated in settler 94 into two phases. The final solvent-S₄-extract phase of this three-stage operation is withdrawn from settler 94 by means of a valved line 100. The solvent-S₄-washed aqueous phase (raffinate from solvent-S₄ treatment) is withdrawn from first-stage settler 91 through a valved line 101. By means of this three-stage operation, the aqueous raffinate from extractor 57 is extracted with a solvent-S₄ in an intermediate contacting zone (second-stage mixer and settler), and the resulting solvent-S₄-extract and aqueous phases are back-washed and solvent-S₄ extracted, respectively, with more selective rejection and extraction of constituents therein in third-stage and first-stage mixers and settlers, respectively. Suitable ratios of solvent-S₄ to aqueous feed to wash water (aqueous acid) are in the order of about 0.5:1:1.

IX. Recovery and concentration of stronger penicillin G

The solvent-S₄-extract, which contains about 90% or more of the penicillin G present in the first aqueous extract, only about 25% or less of the impurity D, only minor proportions of other impurities, and in the order of about 10–15% of the penicillin K in the first aqueous extract, is given a carbon treat in a purifier 102 similar to purifier 74. The carbon-treated solvent-S₄-extract is admixed in a mixer 104 with a dilute aqueous base under conditions to maintain a pH of from about 6.5 to about 7.5, and preferably a value of about 6.8–7.0. The resulting mixture is separated into two phases in a settler 105. The separated solvent-S₄ phase is admixed in a mixer 106 with a further quantity of a dilute aqueous base while maintaining a pH range therein of from about 7.0 to about 8.0, and preferably about 7.2–7.5. Aqueous base may be introduced by any suitable means such as by a valved line 107. The resulting mixture is separated into two phases in a settler 109. The separated solvent-S₄ phase is withdrawn through a valved line 110 and delivered thereby to a suitable solvent recovery process. The separated aqueous phase is withdrawn from settler 109 and delivered to the mixer 104 by means of a valved line 111. The aqueous phase separated in settler 105 is withdrawn through valved line 112. This aqueous phase represents the purified penicillin G fraction of the stronger acid penicillins. This aqueous extract now may be passed into a suitable evaporation zone (not shown) wherein the larger proportion of the water is evaporated from it as quickly as possible under vacuum and at a temperature of not above about 10° C. The resulting evaporated aqueous solution is ready for use, packaging, drying or other treatment as may be desired. This represents the most desirable product from the entire process.

X. Recovery and concentration of stronger penicillin X

In order to recover the stronger penicillin X from the aqueous extract separated in settler 91, said extract which contains substantially only penicillin X and about 30–35% of the impurity D which was present in the first aqueous extract, together with only minor proportions of other penicillins and other impurities, is extracted at a pH of about 2–3.5 with a solvent-S₅ which is a good solvent for the penicillin, such as amyl acetate, methyl isobutyl ketone, etc. In order to accomplish the extraction the aqueous extract is fed through line 101 into an extractor 115 and countercurrently contacted therein by a solvent-S₅ delivered thereto through a line 116. The pH is maintained at about 2–2.5 by introducing aqueous acid to the extraction zone by means of suitable lines 117. Also, aqueous acid may be fed into the feed stream such as by a line 118. It will be understood that a multiple-stage mixer-settler arrangement may be used in place of the extractor 115. The aqueous phase is withdrawn from the extractor 115 by means of a valved line 120 and discharged as reject. The solvent-S₅-extract is withdrawn through a valved line 121, given a carbon treat in a purifier 122 similar to purifiers 74 and 102, to remove color bodies, and recovered and concentrated by contacting with an aqueous base in an extractor 124. Aqueous base is fed to extractor 124 through a line 126 and countercurrently contacted with the solvent-$S_5$-extract. Any suitable pH gradient may be maintained in the extraction zone or sections thereof by proper selection of points of introduction of the aqueous base, which may be at a multiplicity of points. The pH is normally maintined slightly on the basic side of a pH of 7 in the section of the extraction zone near the solvent withdrawal point. It is preferably maintained at a pH of about 6.8-7, i. e. neutral, at the point of withdrawal of the aqueous solution of the penicillin fraction, which is largely the penicillin X. The reject solvent-$S_5$ is withdrawn by a valved line 125 and delivered thereby to a suitable solvent recovery process. The aqueous solution of penicillin X is withdrawn through a valved line 127. This aqueous solution may be further concentrated and dried in the same manner as already described with respect to the penicillin K and penicillin G fractions.

The drawings, for simplicity, do not show auxiliary pumps, pipes, valves, outlets, inlets, tanks, heating lines, cooling lines, system solvent recovery systems, pH indicators, flow controllers, etc., which may be necessary in carrying out this process, because the proper placement of such equipment will be evident to one skilled in the art.

The following example is illustrative of the effectiveness of the process of this invention.

An aqueous penicillin broth was processed through the solvent-$S_1$ extraction, using amyl acetate as the solvent, the subsequent water wash, and the first aqueous extraction, to produce a first aqueous extract having a potency of about 850 units/cc. and having a solid content thereof in the approximate relative parts by weight of: G—45, K—5, A—7.5, E—10, C—7.5, and D—25. Extracting this first aqueous extract with two volumes of dinormalbutyl ether in extractor 48 at a pH of 5.5 effects a separation from the penicillins of predominating proportions of the impurities, A, B, and C. The solvent reject carries out approximately: penicillin—negligible, A—7.4, B—7, C—5.1, and D—3. The aqueous raffinate phase has a potency of about 1100 units/cc. Upon treating the aqueous raffinate with two volumes of chloroform in extractor 57 at a pH of about 5.5 the separated phases are: (1) Chloform phase containing relative weights: G—0.2, K—4, A—negligible, B—2.3, C—1.3, and D—7.2; (2) Aqueous phase containing relative weights: G—44.7, K—0.7, A—nil, B—0.6, C—1.1, and D—14.9. Upon subjecting the penicillin K chloroform extract to two-stage dilute aqueous water treatment the aqueous reject contains about: B—1, and D—3.8, with a potency of only about 75. The washed chloroform extract has a potency of about 950 substantially all K, representing a recovery of K of about 75%. It contains: K—3.9, B—1.2, C—0.9, and D—3.4. The aqueous raffinate phase from extractor 57 after being subjected to a chloroform and water treatment in the three-stage unit comprising mixers 88, 90 and 92 with a chloroform to feed to water ratio of 0.5:1:1 and at a pH of about 2.5 gives a raffinate phase with a potency of about 200 and containing: G—1.2, B—0.3, C—0.2, and D—8.3. The separated chloroform extract from this treatment has a potency of about 1400 and contains: G—43.5, K—0.7, B—0.3, C—0.8, and D—6.5. The penicillin content of this fraction is more than about 95% penicillin G and the recovery of G, based on that present in the first aqueous extract, is of the order of 95% with a corresponding recovery of K in this fraction of about 10—15%.

Thus, in accordance with this application of the invention, effective separation of the weaker penicillins from the stronger penicillins is accomplished while at the same time the separated penicillins are effectively purified of non-antibiotic bodies associated with penicillin in the fermentation preparation of it.

The foregoing example and description of an embodiment of the invention are given for illustrative purposes and should not be construed as in any manner limitative of the invention. As indicated hereinbefore, various combinations of operations may be employed within the purview of the invention for effecting a desired separation of the penicillins and of the impurities naturally associated therewith. Suitable operations and combinations thereof are to be determined from the distribution relationships between the penicillins and the impurities between solvent and aqueous solutions under varying conditions of acidity such as shown in the drawing. From the nature of the curves shown in the different figures of the drawing, it will be understood that these relationships are not simple functions solely of the dissociation constants of the penicillins and of the impurities. If such were the case, the curves representing the distribution coefficients could all be represented as a family of parallel curves. However, this is not the case, as is readily seen from the figures.

As a further illustration of an application of the discoveries of the present invention, reference to Figure III shows that in the case of a chloroform-aqueous system, there is no selectivity between penicillin G and impurity B at a pH of about 3.6, whereas there is considerable selectivity between these two substances and penicillin K at this pH. However, at a pH of about 5.7, there is no selectivity between penicillin K and impurity B, while there is considerable selectivity between these substances and penicillin G at this pH. Therefore, if a mixture of G, K and B is contacted with chloroform and aqueous solution at a pH of about 3.6, K will be selectively dissolved in the chloroform. Now, if the aqueous solution of G and B is extracted at a pH of about 5.7 with chloroform the B will be selectively extracted from the G. The order of the operations may be reversed, to effect the same net separations. Thus, if the same original mixture is contacted with chloroform and aqueous solution at a pH of about 5.7, K and B will be selectively dissolved in the chloroform. Now, by contacting the chloroform phase with aqueous solution at a pH of about 3.6, the impurity B is selectively extracted into the aqueous solution.

We claim as our invention:

1. In a process of treating a mixture containing penicillins G, K and X, and impurities naturally associated therewith in a penicillin fermentation broth for separating penicillin G, K and X, one from the other and separating each from a substantial proportion of said impurities, the steps comprising: contacting said mixture with dinormalbutyl ether and aqueous solution having a pH of from about 5 to about 6 to produce an ether phase containing a substantial proportion of said impurities and an aqueous phase containing a predominant proportion of the penicillins; separating said ether and aqueous phases; contacting the aqueous phase with chloroform at a pH of from about 4.5 to about 6 to form a first chloroform phase containing a major proportion of the penicillin K present in said mixture and a second aqueous phase containing a major proportion of the penicillins G and X present in said mixture; separating said first chloroform phase and said second aqueous phase; contacting the second aqueous phase at a pH of from about 2 to about 4 with chloroform to form a second chloroform phase containing a major proportion of the penicillin G and a third aqueous phase containing a major proportion of the penicillin X; and separating said second chloroform phase and said third aqueous phase.

2. In a process of treating a mixture containing penicillins G, K and X and impurities naturally associated therewith in a penicillin fermentation broth for separating penicillins G, K and X one from the other and separating each from a substantial proportion of said impurities, the steps comprising: contacting said mixture with an aqueous solution having a pH of from about 5 to about 6 and a substantially water-immiscible liquid lower alkyl ether to produce a first solvent phase containing a substantial proportion of said impurities and a first aqueous phase containing a predominant proportion of the penicillins; separating said first solvent phase and said first aqueous phase; contacting the first aqueous phase with a liquid, lower polychlor alkane which is a partially halogenated hydrocarbon at a pH range in the aqueous phase of from about 4.5 to about 6 to produce a second solvent phase containing a major proportion of the penicillin K present in said mixture and a second aqueous phase containing a major proportion of the penicillins G and X present in said mixture; separating said second solvent phase from said second aqueous phase; contacting the second aqueous phase at a pH of from about 2 to about 3.5 with a liquid, lower polychlor alkane which is a partially halogenated hydrocarbon to produce a third solvent phase containing a major proportion of the penicillin G and a third aqueous phase containing a major proportion of the penicillin X; and separating said third solvent phase and said third aqueous phase.

3. In a process of treating a mixture containing penicillins G and K and impurities naturally associated therewith for separating penicillins G and K from a substantial proportion of said impurities and separating penicillin G from penicillin K, the steps comprising: contacting said mixture with an aqueous solution having a pH of from about 3 to about 6 and a substantially water-immiscible liquid lower alkyl ether thereby producing a solvent phase containing a substantial proportion of said impurities and an aqueous phase containing a predominant proportion of the penicillins; separating said solvent phase and said aqueous phase; contacting the aqueous phase with a liquid, lower polychlor alkane which is a partially halogenated hydrocarbon at a pH range in the aqueous phase of from about 3.5 to about 6 and thereby forming a second solvent phase containing a major proportion of the penicillin K present in said mixture and a second aqueous phase containing a major proportion of the penicillin G present in said mixture; and separating said second solvent phase from said second aqueous phase.

4. In a process for the purification of penicillin, the improvement in the separation of penicillin G from penicillin K and in the separation of both of these penicillins from acidic impurities normally associated therewith and which have acidic strengths lower than that of penicillin G, in a mixture thereof, which comprises: contacting said mixture with dinormalbutyl ether and aqueous solution having a pH of from about 5 to about 6 to produce an ether phase containing a substantial proportion of said impurities and an aqueous phase containing a predominant proportion of the penicillins and a portion of said impurities; separating said ether and aqueous phases; contacting the aqueous phase with chloroform at a pH of from about 4.5 to about 6 to produce a chloroform phase containing a major proportion of the penicillin K present in said mixture and a second aqueous phase containing a major proportion of the penicillin G present in said mixture; and separating said chloroform phase and said second aqueous phase.

5. In a process for the purification of penicillin, the improvement in the separation of penicillin G from penicillin K and in the separation of both of these penicillins from acidic impurities normally associated therewith and which have acidic strengths lower than that of penicillin G, in a mixture thereof, which comprises: contacting said mixture with an aqueous solution having a pH of from about 5 to about 6 and a substantially water-immiscible liquid lower alkyl ether to produce a solvent phase containing a substantial proportion of said impurities and an aqueous phase containing a predominant proportion of the penicillins; separating said solvent phase and said aqueous phase; contacting the aqueous phase with a liquid, lower polychlor alkane which is a partially halogenated hydrocarbon at a pH range in the aqueous phase of from about 4.5 to about 6 to produce a second solvent phase which contains a major proportion of the penicillin K present in said mixture and a second aqueous phase which contains a major proportion of the penicillin G present in said mixture; and separating said second solvent phase from said second aqueous phase.

GINO J. PIEROTTI.
ELMER A. ANDERSON.
MOTT SOUDERS, JR.

REFERENCES CITED

The following references are of record in the file of this patent:

Abraham, British J. of Experimental Pathology, vol. 23, June 23, 1942, pp. 103–115.
Cutter, Reports Cu 4 p. 8; Dec. 1, 1944.